July 13, 1926. 1,592,169
F. J. WILKINSON
PIPE CUTTER
Filed May 16, 1924  2 Sheets-Sheet 2
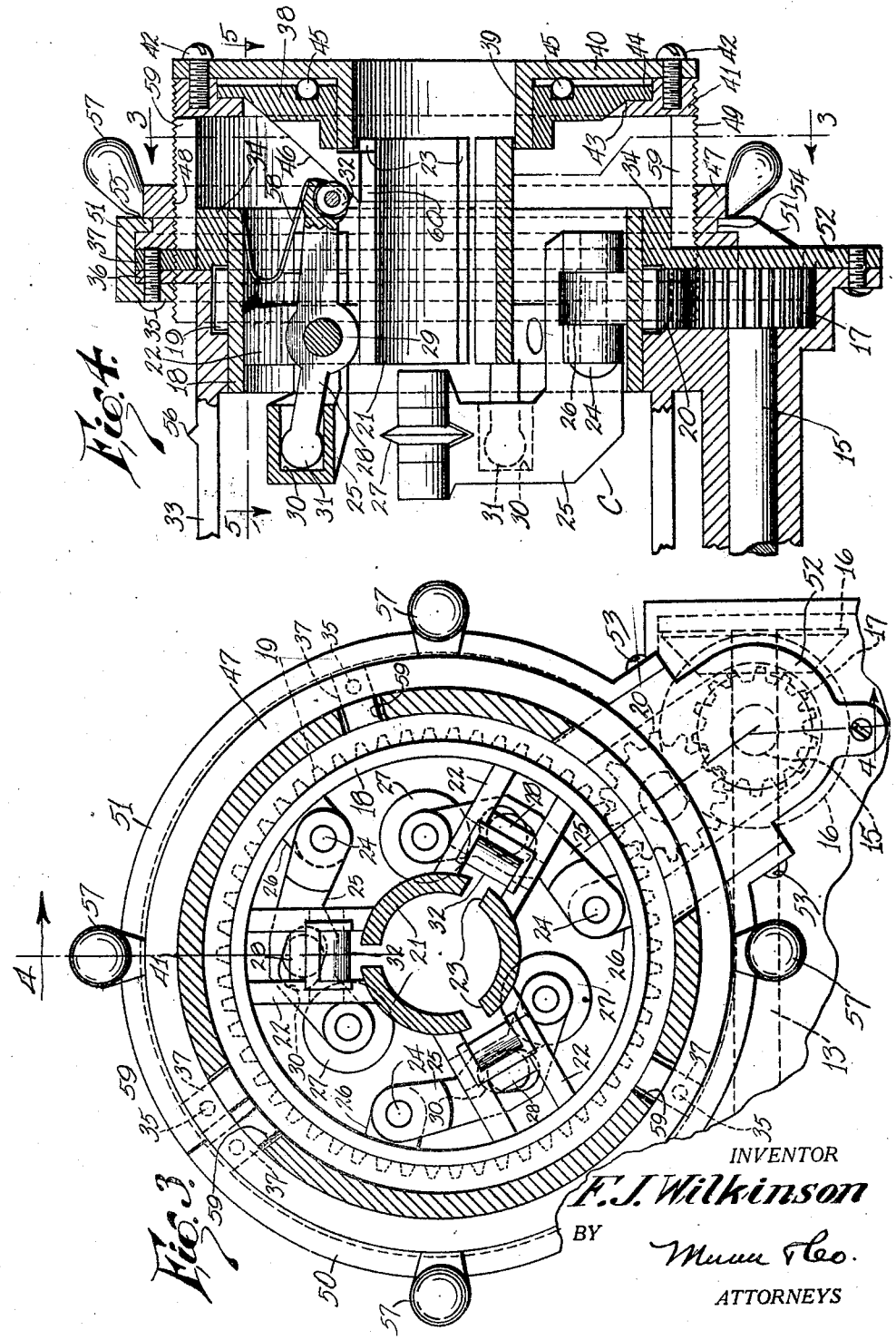

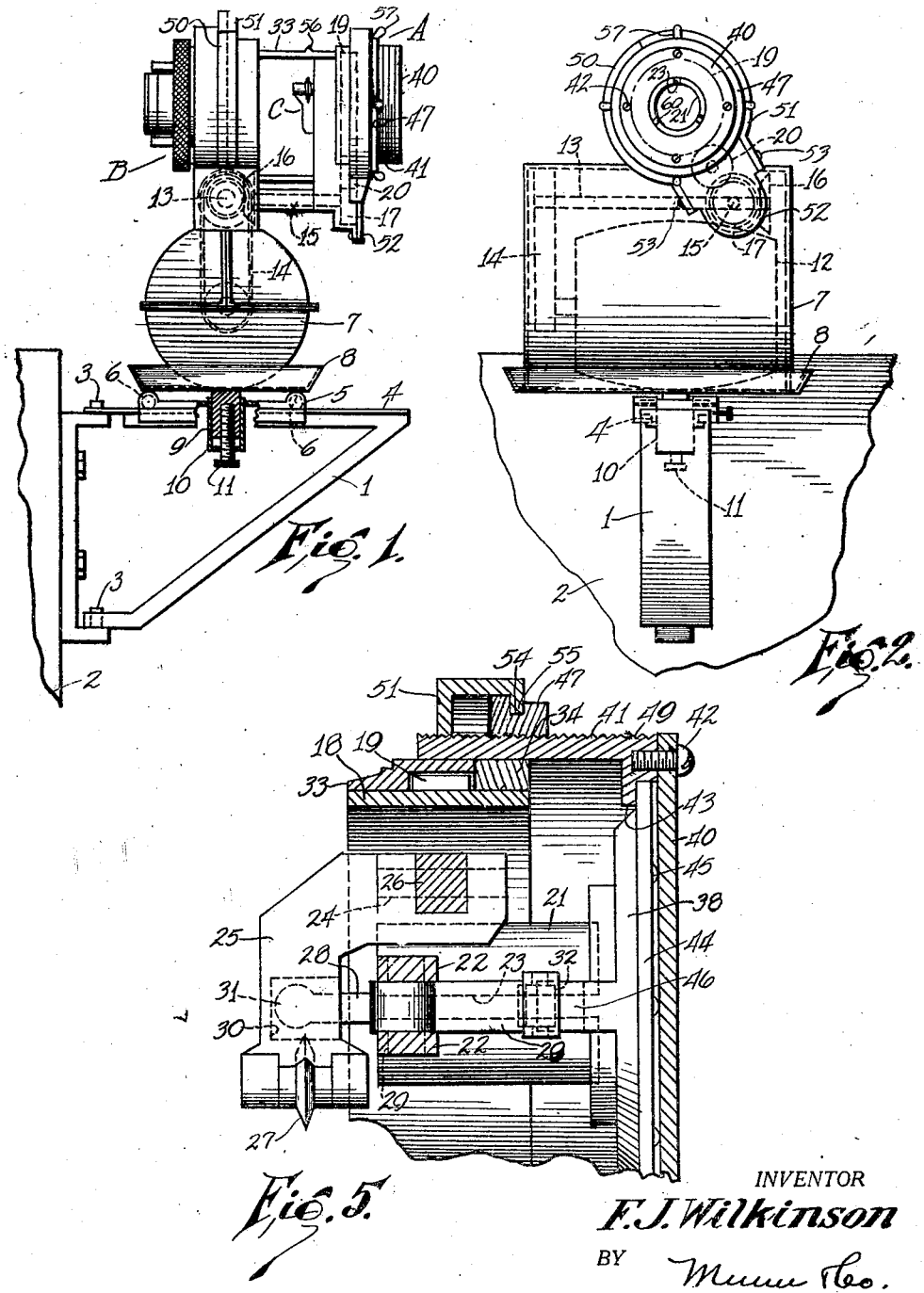

Patented July 13, 1926.

1,592,169

UNITED STATES PATENT OFFICE.

FARLEY JAMES WILKINSON, OF GARY, INDIANA.

PIPE CUTTER.

Application filed May 16, 1924. Serial No. 713,781.

My invention relates to improvements in pipe cutter, and it consists in the combinations, constructions, and arrangements herein described and claimed.

An object of my invention is to provide a pipe cutter of the character described which is operated by a single motor and which is adapted to cut a pipe.

A further object of my invention is to provide a device of the character described in which the pipe cutter is mounted upon a movable base that is adapted to be adjusted with respect to the vise that holds the pipe.

A further object of my invention is to provide a device of the character described in which the cutter is provided with cutting wheels that may be viewed by the operator while they are cutting the pipe.

A further object of my invention is to provide a device of the character described which is quick acting and which has a long life.

A further object of my invention is to provide a device of the character described in which the pipe cutter is provided with novel manually controlled means for moving the cutters into engagement with the pipe.

A further object of my invention is to provide a device of the character described in which the pipe cutter is provided with means for shielding the pipe which is being cut from the moving parts of the pipe cutter.

Other objects and advantages will appear in the following specification, and the novel features of the invention will be particularly pointed out in the appended claims.

My invention is illustrated in the accompanying drawings forming part of this application, in which Figure 1 is a side elevation of the pipe cutter and threader and shows how the pipe cutter and threader are mounted upon a movable base.

Figure 2 is an end view of Figure 1.

Figure 3 is a section along the line 3—3 of Figure 4.

Figure 4 is a section along the line 4—4 of Figure 3, and

Figure 5 is a section along the line 5—5 of Figure 4.

In carrying out my invention I provide a supporting frame 1 which is pivotally secured to a support 2 by means of pins 3. A runway 4 forms a part of the frame 1 and supports a carrier 5. The carrier 5 is supported by wheels 6 that ride upon the runway 4. A motor casing 7 and a drip pan 8 are carried by the carrier 5 and are adapted to be moved in a vertical plane with respect to the carrier. The means for moving the motor and drip pan is clearly shown in Figure 1, and comprises a shank 9 which is slidably received in a sleeve 10 that is supported by the carrier 5. A thumb screw 11 is adapted to raise and lower the shank 9 with respect to the sleeve 10, whereby the motor casing 7 and the drip pan 8 are raised and lowered.

The casing 7 supports a pipe cutter A and a pipe threader B. The pipe threader or die stock forms the subject matter of my co-pending application Serial No. 714,419, filed May 19, 1924, and is described in detail in my co-pending application and is also claimed in that application. The pipe cutter forms the subject matter of this application.

In Figures 1 and 2 I have shown how the movable parts of the pipe cutter are operatively connected to a motor 12 that is disposed in the housing or motor casing 7. A shaft 13 is operatively connected to the motor 12 by means of a link belt 14. The shaft 13 in turn is connected to a shaft 15 by means of gears 16. The opposite end of the shaft 15 has a gear 17 mounted thereon. As clearly shown in Figure 4, the principal moving part of the pipe cutter is a cylindrical shaped pipe receiving member 18. This member has teeth 19 on its outer surface, these teeth being in mesh with a gear 20 which in turn is in mesh with the gear 17. It will be apparent from this construction that when the motor 12 is operated it will rotate the housing 18.

It will be noted from Figures 3 and 4 that I have provided means in the housing 18 for supporting a pipe. This means comprises a cylindrical shaped pipe carrying and protecting member 21 that is concentric with the housing 18 and is spaced from the housing by means of radially extending pieces 22. It will be noted from Figure 3 that the pieces 22 are provided in pairs and that the member 21 is provided with three longitudinally extending slots 23 that extend the entire length of the member 21.

The means for cutting the pipe consists of cutters shown generally at C, these cutters being pivotally secured to the housing 18 by means of pins 24. The pins 24 extend through arms 25 of the cutters and through lugs 26 that are carried by the housing 18. The arms 25 are shaped so as to dispose the cutters 27 exteriorly of the housing 18, whereby the cutters may be viewed while the device is in operation. The cutters 27 are rotatably carried by the arms 25 and are adapted to roll over the pipe while they are cutting the latter. In Figure 3 it will be noted that three cutters are provided, although it is apparent that as many cutters as desired may be used in the device.

A means for moving the cutters toward the longitudinal axis of the housing 18 is shown in Figures 4 and 5. Each pair of supporting members 22 pivotally carries a lever 28. The levers 28 are secured in place by means of pins 29, the pins in turn being carried by the strips 22. The arms 25 are provided with recesses 30 which receive the ball shaped ends 31 of the levers 28. The other end of the lever is provided with rollers 32 for a purpose now to be described.

The housing 18 is carried by a frame 33 which forms a part of the motor frame 7. The housing 18 is also inclosed by means of a frame 34. The frames 33 and 34 form a bearing for the housing 18 and are secured to each other by screws 35, these screws being inserted in lugs 36 that are carried by the frame 33, and by lugs 37 that are carried by the frame 34. In Figure 3 it will be noted that there are four lugs 36 on the frame 33 and four lugs 37 on the frame 34. It is obvious that this number may be changed. I have found that this number answers the purpose for the present construction.

The lever and cutter moving means comprise a turn table 38 that is carried by a bearing 39, this bearing forming a part of the closure 40 for a tubular shaped piece 41. The closure or end piece 40 is fastened to the tubular piece or sleeve 41 by means of screws 42. The sleeve 41 has an inwardly extending flange 43 which bears against a flange 44 of the turn table 38, and prevents inward movement of the turn table 38 with respect to the sleeve 41. Ball bearings 45 are disposed between the turn table 38 and the end piece 40, thus permitting the turn table to rotate freely with respect to the end piece 40.

In the present form of the device the turn table 38 is provided with three cam inclines 46 which are adapted to contact with the three rollers 32, that are carried by the levers 28. It will be apparent from the construction thus far described that when the sleeve 41 is moved inwardly it will cause the roller 32 to ride on the cams 46 and to swing the cutters 27 toward the longitudinal axis of the housing 18.

The means for moving the sleeve 41 inwardly is manually controlled and comprises a ring 47 that has its bore threaded. The ring is rotatably mounted upon the sleeve 41 and the threads 48 of the ring 47 mesh with the threads 49 of the sleeve 41, whereby a rotation of the ring 47 will move the sleeve 41. The ring 47 is secured to the frames 33 and 34 by means of two semi-circular strips 50 and 51. These strips are secured to the lugs 26 and 37 by means of the screws 35, and are secured to a projection 52 of the frame 34 that forms the housing for the gears 17 and 20. The screws 53 secure the strips to the projection 52. The ring 47 has an annular groove 54 which receives a flange 55, this flange being part of the strips 50 and 51.

From the foregoing description of the various parts of the device, the operation thereof may be readily understood. The pipe to be cut is held by a vise (not shown) and the pipe cutter A and the die stock B is centered with respect to the pipe, and is moved on over the pipe so as to cause the tubular member 21 to receive the pipe. The pipe has previously been marked so as to inform the operator at what place to cut the pipe. This mark is alined with the projection 56 on the frame 33, the projection in turn being in alignment with the cutters 27. As heretofore described the cutter A may be centered with respect to the pipe to be cut, the centering of the cutter being accomplished by means of the thumb screw 11.

The operator now brings the cutters 27 into engagement with the pipe and then starts the motor. The motor rotates the housing 18 and causes the cutters to travel around the pipe. The cutters are moved radially toward the longitudinal axis of the housing 18 when the ring 47 is rotated. The ring 47 is provided with handles 57 for this purpose. When the ring 47 is rotated it will move the sleeve 41 inwardly, which in turn will move the turn table 38 inwardly and will swing the cutters 27 toward each other. The operator continues to operate the ring 47 until the cutters 27 sever the portion of the pipe to be cut from the length of pipe. When the ring 47 is rotated in the reverse direction, springs 58 will swing the cutters and levers out of engagement with the pipe. The sleeve 41 is provided with slots 59 which receive the lugs 36 and 37 and also the projections 52. It will be noted from Figure 4 that the turn table 38 has projections 60 that are slidably disposed in the slots 23, and thus causes the turn table to be rotated with the tubular member 21. In this way the turn table is rotated with respect to the end 40.

I claim:

A device of the type described comprising a housing, a pipe-carrying member rotatably carried by said housing, means for rotating said housing, cutter-carrying arms pivotally secured to said housing and having their free ends projecting exteriorly of said housing, levers pivotally secured to said housing and being operatively connected to said arms for swinging said arms, a manually-controlled cam member for causing the levers to swing said arms toward each other, and cutters carried by the free ends of said arms, there being an indicating projection on said housing in alignment with said cutters.

FARLEY JAMES WILKINSON.